J. SCHMIDT.
BEAD FORMING RING FOR MOLDING PNEUMATIC TIRES.
APPLICATION FILED AUG. 25, 1919.
1,350,117.
Patented Aug. 17, 1920.
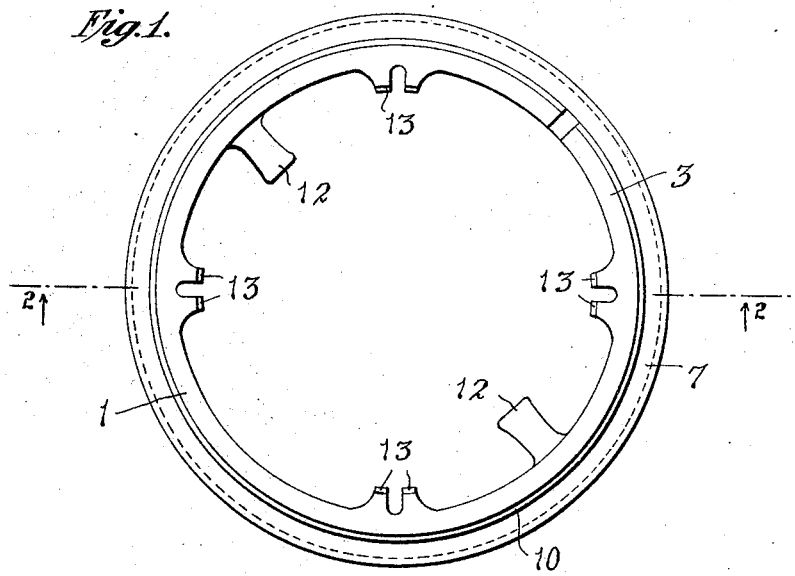
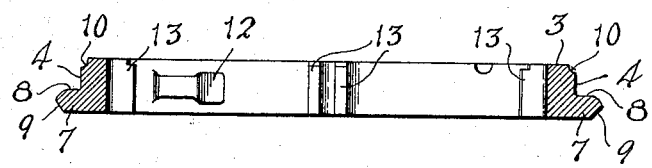
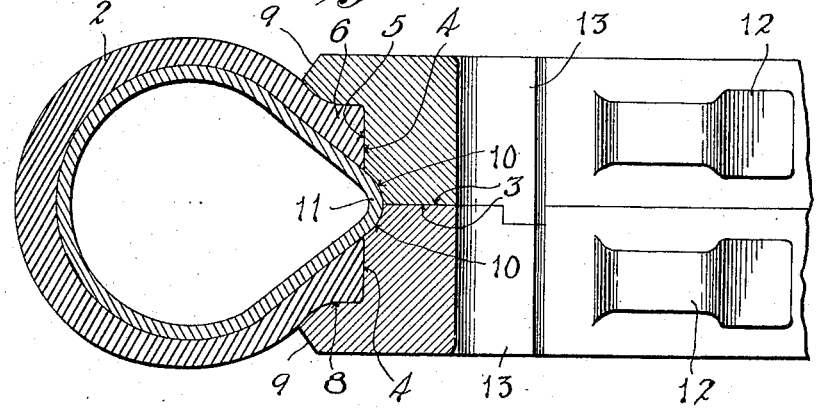
INVENTOR:
John Schmidt,
BY
Russell M. Everett,
ATTORNEY

UNITED STATES PATENT OFFICE.

JOHN SCHMIDT, OF NEW BRUNSWICK, NEW JERSEY, ASSIGNOR, BY MESNE ASSIGNMENTS, TO HOWE RUBBER CORPORATION, A CORPORATION OF DELAWARE.

BEAD-FORMING RING FOR MOLDING PNEUMATIC TIRES.

1,350,117. Specification of Letters Patent. Patented Aug. 17, 1920.

Application filed August 25, 1919. Serial No. 319,599.

*To all whom it may concern:*

Be it known that I, JOHN SCHMIDT, a citizen of the United States, and a resident of New Brunswick, in the county of Middlesex and State of New Jersey, have invented new and useful Improvements in Bead-Forming Rings for Molding Pneumatic Tires, of which the following is a specification.

This invention relates more especially to the molding of pneumatic rubber automobile tires by the use of an interior flexible form, which is usually pneumatic and known as an air-bag. This air-bag is sufficiently heavy and strong to resist the inflation ultimately given it, and is first inserted in the partially shaped tire in a somewhat soft condition; one of a pair of coöperating bead-forming rings is laid on a suitable support, in a substantially horizontal plane, and the tire with the air-bag in it is approximately positioned on said ring; then the other ring of the pair is laid in place on the tire, above the first-mentioned ring, and the two rings are gradually drawn together by clamps or bolts, so that they form shaping surfaces for the beads of the tire. The mold later receives the tire and bead-forming rings, and upon subjecting the whole to the proper heat, with the air-bag inflated to the proper pressure, the tire is given the desired form or shape of beads, tread and so forth.

The bead-forming rings heretofore used as above described have had cylindrical surfaces at their peripheries which come together to fit against the inner annular surface of the tire and flexible form, and flat contacting side faces which met said cylindrical surfaces at sharp corners. The flexible form is exposed between the beads of the tire, and in bringing the old bead-forming rings together as described the flexible form tends to protrude or project from between the beads into the space between the rings and become pinched or caught as they are clamped together. When this happens, the flexible form is given an improper and distorted shape and the tire therefore becomes imperfect and unsalable; furthermore, the flexible form is cut or weakened, so that its life is shortened, and inasmuch as these forms are expensive, the cost of producing the tires is greatly increased. To avoid pinching the flexible form, therefore, the workman must use great care, and bring the bead-forming rings together slowly, reaching in between them with a tool every few turns of the clamps to push back the form so that it shall not project between the rings. This takes time and increases the cost of the tire. Even with the utmost care, the sharp corner edges of the rings scrape along the flexible form, as they approach each other, crowding the same back and wearing or cutting it.

The objects of the present invention are to provide bead-forming rings which shall automatically force the flexible form back or out from between the contacting side faces of the rings; to thus enable the rings to be more quickly assembled on a tire, and save labor and expense; to avoid damaging the flexible form and thus prolong its life; to secure these results by cutting away the corner edges of the rings, or recessing them, where they come together in engagement with the flexible form; to cut away said corners, or recess the rings, by grooves with transversely rounded bottoms; to concavely round or curve said grooves or recesses, so as to better push back the flexible form automatically, and to obtain other advantages and results as may be brought out in the following description.

Referring to the accompanying drawing, in which like numerals of reference indicate the same parts throughout the several views.

Figure 1 is a face view of a bead-forming ring of my improved construction;

Fig. 2 is a cross-section of the same, and

Fig. 3 is a cross-section of a pair of the rings applied to a tire with a flexible form inside the same.

In the specific embodiment of the invention shown in said drawings, 1, 1 indicate bead-forming rings of my improved construction, the two adapted to coöperate as a pair in molding a tire 2. These rings have contacting inner side faces 3, 3 and each has an outer peripheral surface 4 which is cylindrical and adapted to form the base 5 of a bead 6 of the tire. At the opposite edge of said peripheral surface 4 from the contacting face 3, each ring has a radially projecting flange 7 with a side surface 8 to form the outer side of the bead 6 and an end wall 9 against which the main part of the mold (not shown) fits to shape the tread surface of the tire. Thus when the two rings are clamped together upon a tire they are adapted to shape or form the beads of the tire, as illustrated in Fig. 3 for one form of beads; obviously by shaping the bead-forming surfaces of the rings in other ways, other forms of beads can be produced, as is common and well-known in the art.

In carrying out my invention, the corner edge of each ring between its contacting face 3 and peripheral surface 4 is recessed or cut away, as at 10, so that when the two rings are together, as shown in Fig. 3, they provide at the middle of their outer peripheral surface a groove which extends clear around the rings and is adapted to receive the inner edge portion 11 of the flexible form which projects between the beads 6, 6 of the tire. Preferably this groove thus formed is transversely rounded or curved, concavely, as I have found that this shape enables the rings to best push back the flexible form automatically as the rings are brought together by clamping. At the same time, I do not intend in any way to restrict myself to that particular shape of recess, as it is within the scope of my invention to employ any form of recess which will automatically crowd the flexible form into the tire and out from between the bead-forming rings as they are clamped together. By the use of my improved rings, little if any attention need be given to the flexible form, and the rings can be clamped directly and immediately together, which effects a great saving of labor and time; the flexible form is brought automatically into its proper place without being damaged or cut, and its life is greatly prolonged as well as a more perfect and salable product obtained.

I have shown the interior surfaces of the rings 1, 1 provided with liftings lugs 12, 12 and with a series of pairs of clamping lugs 13, 13 adapted to receive the usual clamping bolts (not shown), but it will be understood that these features have nothing to do with my invention and may be of any suitable and well-known form common to the art.

Obviously detail modifications and changes may be made in manufacturing my improved bead-forming ring without departing from the spirit and scope of the invention, and I do not wish to be understood as restricting myself except as required by the following claims when construed in the light of the prior art.

Having thus described the invention, what I claim is:

1. A tire-bead forming ring having its inner corner edge cut away.

2. A tire bead-forming ring having its inner corner edge recessed.

3. A tire bead-forming ring having its inner corner edge cut away by a groove.

4. A tire bead-forming ring having its inner corner edge cut away by a transversely rounded groove.

5. A tire bead-forming ring havings its inner corner edge cut away by a groove which is transversely concaved.

6. A pair of bead-forming rings having at their adjacent sides contacting surfaces adapted to be clamped together and having peripheral bead-forming surfaces, said rings having each between its said surfaces an annular surface at an angle thereto and adapted to engage a flexible form.

7. A pair of bead-forming rings having peripheral bead-forming surfaces and providing between said surfaces a groove or recess to receive a flexible form.

8. A pair of bead-forming rings having peripheral bead-forming surfaces and providing between said surfaces a transversely rounded groove to receive a flexible form.

9. A pair of bead-forming rings having peripheral bead-forming surfaces and providing between said surfaces a groove or recess which is transversely concaved to receive a flexible form.

10. A pair of bead-forming rings having peripheral bead-forming surfaces and providing between said surfaces a groove or recess with inclined side walls to receive a flexible form.

11. A pair of bead-forming rings having peripheral bead-forming surfaces and providing between said surfaces a groove or recess to receive a flexible form, and means for clamping said rings together.

JOHN SCHMIDT.

Witness:
   E. H. MONAGHAN.